United States Patent Office 2,719,134
Patented Sept. 27, 1955

2,719,134

MIXTURES COMPRISING ACRYLONITRILE POLYMERS WITH POLYMERIC PHOSPHONIC ACID DIAMIDES

Harry W. Coover, Jr., Kingsport, Tenn., assignor to Eastman Kodak Company, Rochester, N. Y., a corporation of New Jersey No Drawing. Application March 12, 1952,
Serial No. 276,226

18 Claims. (Cl. 260—32.6)

This invention relates to resinous compositions comprising mixtures of acrylonitrile polymers with resinous, polymeric phosphonic acid diamides.

It is known that polyacrylonitrile fibers can be spun which have excellent physical properties such as high strength, high sticking temperature and good resistance to shrinkage at elevated temperatures. However, such fibers show certain disadvantageous properties which severely limit their commercial use such as low moisture absorption and more especially poor dyeability with most presently available dyes of the cellulose acetate, direct cotton, acid wool and vat type of dyes. For a great many textile purposes, improved dyeability of polyacrylonitrile fibers or fibers produced from polymers containing about 80 per cent or more of acrylonitrile would be highly desirable.

It is further known that greatly increased moisture absorption and dyeability of acrylonitrile fibers can be obtained by copolymerizing acrylonitrile with certain hydrophilic monomers such as acids, amides, esters, etc. which contain an unsaturated ethylenic linkage. The degree of improvement in these properties has been found to vary with type and amount of the monomer copolymerized with acrylonitrile. When an amount of modifier has been copolymerized with acrylonitrile sufficient to give desirable moisture absorption and dyeability, it is usually found that the resulting fibers have such low sticking temperatures and high shrinkage at elevated temperatures that they are not suitable for most textile purposes. For example, when acrylonitrile is copolymerized with from 15 to 25 per cent of its weight of acrylamide, the resulting fibers show good moisture absorption and dyeability, but their sticking temperatures are about 150° C., and they shrink about 50 per cent in length in boiling water. Polyacrylonitrile fibers with no modifier have a sticking temperature of 200° C. or higher, and they shrink only about 5 per cent in boiling water. The amount of reduction in sticking temperature and increase in shrinkage at elevated temperatures of fibers obtained from copolymers of acrylonitrile and hydrophilic monomers varies with the amount and type of the modifying monomer, but a loss in these two desirable properties of polyacrylonitrile fibers by copolymerization is usually the case.

I have now found that polyacrylonitrile can be modified to give fibers which show good moisture absorption, dyeability and improved flame resistance and, at the same time, no reduction in sticking temperature or increase in shrinkage at elevated temperatures, by intimately mixing polyacrylonitrile or acrylonitrile polymers, containing 80 per cent or more by weight of acrylonitrile and the remainder of another ethenoid monomer, with certain critical proportions of resinous, polymeric phosphonic acid diamides. The new mixed compositions form stable, homogeneous solutions in most of the organic solvents which dissolve polyacrylonitrile, and the fibers produced from such solutions also are of homogeneous composition with no segmentation defects.

It is, accordingly, an object of the invention to provide new resinous compositions comprising mixtures of polyacrylonitrile or acrylonitrile polymers with resinous, polymeric phosphonic acid diamides. Another object is to provide homogeneous solutions of these mixtures. Another object is to provide fibers from these mixtures which have good dyeability and other desirable properties. Another object is to provide methods for preparing the products of my invention. Other objects will become apparent hereinafter.

In accordance with my invention, I prepare resinous compositions comprising mixtures of from 60 to 95 parts by weight of polyacrylonitrile or of an acrylonitrile polymer containing 80 per cent or more by weight of acrylonitrile, and from 40 to 5 parts by weight of a resinous, linear polymer of a phosphonic acid diamide, the said polymer consisting of the recurring structural unit

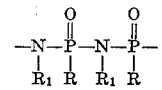

wherein R represents a hydrocarbon group such as an alkyl group containing from 1 to 4 carbon atoms (e. g. methyl, ethyl, propyl, isopropyl, butyl, etc. groups) and an aryl group such as phenyl, tolyl etc., and $R_1$ represents an atom of hydrogen or an alkyl group containing from 1 to 4 carbon atoms more than one of the resinous, polymeric phosphonic acid diamides can be admixed with the polyacrylonitrile, but the total amount of such diamides must be within the specified range of 40 to 5 parts by weight. The above mixtures can be prepared by any or several methods. For example, the polymeric components can be mixed together in a suitable mixer such as a ball mill or Banbury mixer, or they can be dissolved in one or more mutual solvents such as N,N-dimethyl formamide, N,N-dimethyl acetamide, gamma-butyrolactone, etc. The components can be mixed together before addition to the solvent or they can be added separately to the solvent. They can also be added to the solvent to produce a slurry or dispersion, which is then agitated and heated to complete dissolution. The concentration of the polymers can be varied, depending on the use for which the particular composition is intended.

The solutions prepared as above described are stable, homogeneous mixtures which show no tendency to separate into the components. The absence of graininess in these solutions permits smooth, trouble-free extrusion through jets in both wet and dry spinning processes. Fibers prepared from the solutions by either wet or dry spinning methods can be readily dyed to even, dark shades with various organic dyes. The dyed fibers show excellent fastness to light and laundering.

The resinous, polymeric phosphonic acid diamides employed in my invention are prepared by heating a monomeric organo-phosphonic acid diamide of the mentioned R and $R_1$ values at from 200° to 350° C., until a polymer of desired molecular weight results. In general, the unsubstituted polymeric phosphonic acid diamides have softening points above 225° C., while the N-alkyl substituted polymers have somewhat lower softening points above 150° C. Suitable resinous, polymeric phosphonic acid diamides are prepared by the above condensation process from monomeric methane phosphonic acid diamide, ethane phosphonic acid diamide, the propane phosphonic acid diamides, the butane phosphonic acid diamides, benzene phosphonic acid diamide, the toluene phosphonic acid diamides, and the corresponding N,N'-dialkyl organo phosphonic acid diamides such as, for example, N,N'-dimethyl benzene phosphonic acid diamide, N,N'-dimethyl ethane phosphonic acid diamide, etc. One or more of the above diamides can be co-condensed together to give generally similar resinous polymers. Further details for the preparation of the above kind of resinous polymers are set forth in copending application Serial No. 209,198, filed February 2, 1951, in the names of Joseph B. Dickey and Harry W. Coover, Jr. (now U. S. Patent 2,666,750, dated January 19, 1954).

The following examples will serve to illustrate further the new resinous compositions of my invention and the manner of their preparation.

*Example 1*

Fibers obtained from a mixture of 95 parts by weight of polyacrylonitrile and 5 parts by weight of polybenzene phosphonic acid diamide comprising the recurring structural unit

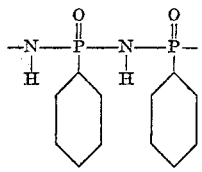

had a tenacity of 3.6 gram per denier and extensibility of 15 per cent, and would shrink only 8 per cent in boiling water. The fibers had fair affinity for cellulose acetate, acid wool, direct cotton and vat dyes.

In place of the polybenzene phosphonic acid diamide in the above example, there can be substituted a like amount of poly toluene phosphonic acid diamide or poly o-toluene phosphonic acid diamide to give corresponding and generally similar fibers.

*Example 2*

Fibers obtained from a mixed composition of 60 parts by weight of polyacrylonitrile and 40 parts by weight of polybenzene phosphonic acid diamide had a tenacity of 3 g./d. and extensibility of 15 per cent, and would shrink 7 per cent in boiling water. The fibers had excellent affinity for cellulose acetate, acid wool, direct cotton and vat dyes.

In place of the polybenzene phosphonic acid diamide in the above example, there can be substituted a like amount of poly p-toluene phosphonic acid diamide to give corresponding and generally similar fibers.

*Example 3*

Fibers obtained from a mixed composition of 75 parts by weight of polyacrylonitrile and 25 parts by weight of a resinous polymer containing 70 per cent by weight of benzene phosphonic acid diamide and 30 per cent by weight of urea (approximately a 1:1 polymer of benzene phosphonic acid diamide and urea) had a tenacity of 4.7 g./d. and extensibility of 13 per cent, and would shrink 5 per cent in boiling water. The fibers had a softening point above 200° C. and exhibited good flame resistance and dyeability.

In place of the resinous polymer of benzene phosphonic acid diamide in the above example, there can be substituted resinous polymers containing equivalent amounts of urea and one or more of mentioned phosphonic acid diamides of the invention such as, for example, a resinous polymer of N,N'-dimethyl benzene phosphonic acid diamide and urea, a resinous polymer of n-butane phosphonic acid diamide and urea, etc., to give similarly good quality, dyeable fibers. The phosphonic acid diamide-urea resinous condensation polymers can be prepared as described in my copending application Serial No. 260,589, filed December 7, 1951, now Patent Number 2,642,413.

*Example 4*

Fibers obtained from a mixture of 75 parts by weight of polyacrylonitrile and 25 parts by weight of poly N,N'-dimethyl benzene phosphonic acid diamide comprising the recurring structural unit

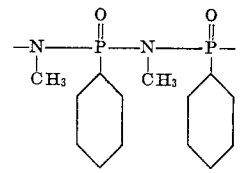

had a tenacity 3.5 g./d. and extensibility of 18 per cent, and would shrink 9 per cent in boiling water. The fibers had a softening point above 200° C. and excellent affinity for cellulose acetate, acid wool, direct cotton and vat dyes.

In place of the poly N,N'-dimethyl benzene phosphonic acid diamide in the above example, there can be substituted a like amount of other diamides, for example, poly N,N'-diethyl benzene phosphonic acid diamide, poly N,N'-n-dipropyl benzene phosphonic acid diamide, poly N,N'-diisopropyl benzene phosphonic acid diamide or poly N,N'-n-dibutyl benzene phosphonic acid diamide to give corresponding stable and compatible mixtures with polyacrylonitrile from which compositions generally similar fibers can be prepared by wet or dry spinning methods.

*Example 5*

Fibers obtained from a mixture of 80 parts by weight of polyacrylonitrile and 20 parts by weight of poly n-butane phosphonic acid diamide had a tenacity of 4.1 g./d. and extensibility of 18 per cent, and would shrink 8 per cent in boiling water. The fibers had a softening point above 200° C. and exhibited excellent affinity for acetate, wool, direct and vat dyes.

In place of the polybutanephosphonic acid diamide in the above example, there can be substituted a like amount of other diamides, for example, polymethane phosphonic acid diamide, polyethane phosphonic acid diamide, poly N,N'-dimethyl n-butane phosphonic acid diamide, poly N,N'-dimethyl methane phosphonic acid diamide, poly N,N'-dimethylethane phosphonic acid diamide, poly N,N'-diethyl butane phosphonic acid diamide, and the like, to give corresponding stable and compatible mixed compositions from which fibers of generally similar properties can be spun.

Although the invention has been illustrated with certain specific mixtures in the preceding examples, it will be apparent that generally similar fibers are obtained from any of the mixed compositions coming within the specified range of from 60 to 95 parts by weight of polyacrylonitrile and from 40 to 5 parts by weight of one or more of the mentioned polymeric organophosphonic acid diamides. The solutions of my mixed compositions in one or more organic solvents such as N,N-dimethyl formamide, N,N-dimethyl acetamide, gamma-butyrolactone, ethylene carbonate, N-methyl-2-pyrrolidone, etc. in addition to are being useful for spinning fibers, can also be used, with or without added fillers, pigments, dyes, plasticisers, etc., for coating various surfaces or for making tough and flexible sheeting materials.

What I claim is:

1. A resinous composition comprising a mixture of from 60 to 95 parts by weight of polyarcylonitrile and from 40 to 5 parts by weight of a resinous polymer selected from the group consisting of a resinous polymer obtained by heating at from 200° to 350° C. a monomeric phosphonic acid diamide having the general formula:

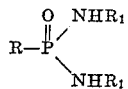

wherein R represents a member selected from the group consisting of an alkyl group containing from 1 to 4 carbon atoms, a phenyl group and a tolyl group and $R_1$ represents a member selected from the group consisting of an atom of hydrogen and an alkyl group containing from 1 to 4 carbon atoms, and a resinous polymer obtained by heating at from 200° to 350° C. approximately equimolar amounts of the said monomeric phosphonic acid diamide and urea.

2. A resinous composition comprising a mixture of from 60 to 95 parts by weight of polyacrylonitrile and from 40 to 5 parts by weight of resinous polybenzene phosphonic acid diamide.

3. A resinous composition comprising a mixture of from 60 to 95 parts by weight of polyacrylonitrile and from 40 to 5 parts by weight of resinous poly N,N'-dimethyl benzene phosphonic acid diamide.

4. A resinous composition comprising a mixture of from 60 to 95 parts by weight of polyacrylonitrile and from 40 to 5 parts by weight of resinous polybutane phosphonic acid diamide.

5. A resinous composition comprising a mixture of from 60 to 95 parts by weight of polyacrylonitrile and from 40 to 5 parts by weight of a resinous polymer obtained by heating at from 200° to 350° C. approximately equimolar amounts of phenylphosphonediamide and urea.

6. A resinous composition comprising a mixture of from 60 to 95 parts by weight of polyacrylonitrile and from 40 to 5 parts by weight of resinous poly N,N'-dimethyl n-butane phosphonic acid diamide.

7. A solution of a resinous composition comprising a mixture of from 60 to 95 parts by weight of polyacrylonitrile and from 40 to 5 parts by weight of a resinous polymer selected from the group consisting of a resinous polymer obtained by heating at from 200° to 350° C. a monomeric phosphonic acid diamide having the general formula:

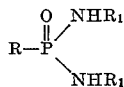

8. A solution of a resinous composition comprising a mixture of from 60 to 95 parts by weight of polyacrylonitrile and from 40 to 5 parts by weight of resinous polybenzene phosphonic acid diamide, in N,N-dimethyl formamide.

9. A solution of a resinous composition comprising a mixture of from 60 to 95 parts by weight of polyacrylonitrile and from 40 to 5 parts by weight of resinous poly N,N'-dimethyl benzene phosphonic acid diamide, in N,N-dimethyl formamide.

10. A solution of a resinous composition comprising a mixture of from 60 to 95 parts by weight of polyacrylonitrile and from 40 to 5 parts by weight of resinous polybutane phosphonic acid diamide, in N,N-dimethyl formamide.

11. A solution of a resinous composition comprising a mixture of from 60 to 95 parts by weight of polyacrylonitrile and from 40 to 5 parts by weight of a resinous polymer obtained by heating at from 200° to 350° C. approximately equimolar amounts of phenylphosphonediamide and urea, in N,N-dimethyl formamide.

12. A solution of a resinous composition comprising a mixture of from 60 to 95 parts by weight of polyacrylonitrile and from 40 to 5 parts by weight of resinous poly N,N'-dimethyl n-butane phosphonic acid diamide, in N,N-dimethyl formamide.

13. A synthetic fiber comprising from 60 to 95 parts by weight of polyacrylonitrile and from 40 to 5 parts by weight of a resinous polymer selected from the group consisting of a resinous polymer obtained by heating at from 200° to 350° C. a monomeric phosphonic acid diamide having the general formula:

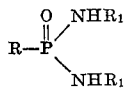

wherein R represents a member selected from the group consisting of an alkyl group containing from 1 to 4 carbon atoms, a phenyl group and a tolyl group and $R_1$ represents a member selected from the group consisting of an atom of hydrogen and an alkyl group containing from 1 to 4 carbon atoms, and a resinous polymer obtained by heating at from 200° to 350° C. approximately equimolar amounts of the said monomeric phosphonic acid diamide and urea.

14. A synthetic fiber comprising from 60 to 95 parts by weight of polyacrylonitrile and from 40 to 5 parts by weight of resinous polybenzene phosphonic acid diamide.

15. A synthetic fiber comprising from 60 to 95 parts by weight of polyacrylonitrile and from 40 to 5 parts by weight of resinous poly N,N'-dimethyl benzene phosphonic acid diamide.

16. A synthetic fiber comprising from 60 to 95 parts by weight of polyacrylonitrile and from 40 to 5 parts by weight of resinous polybutane phosphonic acid diamide.

17. A synthetic fiber comprising from 60 to 95 parts by weight of polyacrylonitrile and from 40 to 5 parts by weight of a resinous polymer obtained by heating at from 200° to 350° C. approximately equimolar amounts of phenylphosphonediamide and urea.

18. A synthetic fiber comprising from 60 to 95 parts by weight of polyacrylonitrile and from 40 to 5 parts by weight of resinous poly N,N'-dimethyl n-butane phosphonic acid diamide.

References Cited in the file of this patent

UNITED STATES PATENTS 2,642,406     Dickey et al. _____ June 16, 1953